(12) United States Patent
Rajagopal et al.

(10) Patent No.: US 12,499,023 B2
(45) Date of Patent: Dec. 16, 2025

(54) DETERMINING CONFIGURATIONS TO BE USED IN SYSTEM TESTING PROCESSES USING MACHINE LEARNING TECHNIQUES

(71) Applicant: Dell Products L.P., Round Rock, TX (US)

(72) Inventors: Rajasekaran Rajagopal, Franklin, MA (US); Nir Harel, Moshav Kidron (IL); Daoru Li, Beijing (CN)

(73) Assignee: Dell Products L.P., Round Rock, TX (US)

(*) Notice: Subject to any disclaimer, the term of this patent is extended or adjusted under 35 U.S.C. 154(b) by 148 days.

(21) Appl. No.: 18/370,615

(22) Filed: Sep. 20, 2023

(65) Prior Publication Data

US 2025/0094299 A1    Mar. 20, 2025

(51) Int. Cl.
*G06F 11/22*    (2006.01)

(52) U.S. Cl.
CPC ...... *G06F 11/2247* (2013.01); *G06F 11/2205* (2013.01); *G06F 11/2263* (2013.01)

(58) Field of Classification Search
CPC ............. G06F 11/2247; G06F 11/2205; G06F 11/2263
See application file for complete search history.

(56) References Cited

U.S. PATENT DOCUMENTS

2019/0132741 A1*  5/2019  Stone ........................ G06F 3/02
2023/0251960 A1*  8/2023  Sharma .................... G06N 5/04
                                                        717/124
2023/0394327 A1* 12/2023  Frazier ................ G06F 11/3612
2024/0144141 A1*  5/2024  Cella .................. G06Q 30/0206
2024/0411535 A1* 12/2024  Ken-Kwofie ............. G06F 8/51
2025/0045189 A1*  2/2025  Mishra ................... G06N 20/00

OTHER PUBLICATIONS

Scikit-Learn.org, Scikit-Learn: Machine Learning in Python, https://scikit-learn.org/stable/, Sep. 13, 2023.

(Continued)

*Primary Examiner* — Henry Tsai
*Assistant Examiner* — Christopher A Daley
(74) *Attorney, Agent, or Firm* — Ryan, Mason & Lewis, LLP

(57) ABSTRACT

Methods, apparatus, and processor-readable storage media for determining configurations to be used in system testing processes using machine learning techniques are provided herein. An example computer-implemented method includes obtaining, from multiple data sources, configuration information associated with at least one system; filtering out a subset of the configuration information based at least in part on at least one user request related to testing of at least a portion of the at least one system; determining at least a portion of the subset of the configuration information to be used in the testing of the at least a portion of the at least one system by processing the subset of the configuration information using one or more machine learning techniques; and performing one or more automated actions based on the determined at least a portion of the subset of the configuration information to be used in the testing.

20 Claims, 12 Drawing Sheets

(56) References Cited

OTHER PUBLICATIONS

Scikit-Learn.org, sklearn.cluster.BisectingKMeans, https://scikit-learn.org/stable/modules/generated/sklearn.cluster.BisectingKMeans.html, Jun. 9, 2023.
Scikit-yb.org, Elbow Method, https://www.scikit-yb.org/en/latest/api/cluster/elbow.html, Jun. 5, 2023.
Github.com, Jira, https://github.com/pycontribs/jira, Aug. 17, 2023.
Github.com, Plotly, https://github.com/plotly/plotly.py, Aug. 16, 2023.
Github.com, Pandas, https://github.com/pandas-dev/pandas, Aug. 23, 2023.
Github.com, Numpy, https://github.com/numpy/numpy, Sep. 17, 2023.
Dell Technologies, Dell CloudIQ: A Detailed Review, A Proactive Monitoring and Analytics Application for the Dell Environment, Jan. 2023.
Tutorialspoint.com, qTest, https://www.tutorialspoint.com/qtest/qtest_introduction.htm, Jun. 8, 2023.

* cited by examiner

Input: a plain text file for a test configuration
Output: a JavaScript Object Notation (JSON) file for the test configuration Read-in the plain text file (.txt)
Create a Python list to hold the information for this text file
Scan the file line-by-line:
    at each iteration, check if a new table is to be entered:
        if so,
            append the previous Python dictionary to the list
            use regular expression (RE) to find the table name
            create a Python dictionary to hold the information for this table
            continue to the next iteration
        if not,
            use RE to find the column/row name (depending on table orientation)
            use RE to find the column/row value (depending on table orientation)
            store the key-value pair into the current Python dictionary
Store the list of Python dictionaries into a JSON file

FIG. 5

```
9  ****************************************************************
10 Cluster Information
11 ****************************************************************
12 cluster_id ........................: PSxxx1234y2z8q
13 cluster_name ......................: XXXABCSTORE1
14 cluster_state .....................: CONFIGURED
15 release_version ...................: 2.1.0.0
16 compatibility_level ...............: 15
17 is_encryption_enabled .............: True
18 master_appliance_id ...............: A1
19 num_of_current_active_alerts ......: 8
20 num_of_host_mapping ...............: 2
21 num_of_mappings ...................: 243
22 num_of_vol_mapping ................: 243
23 num_of_file_systems ...............: 0
24 num_of_nfs_export .................: 0
25 num_of_smb_shares .................: 0
26 number_of_vcenters ................: 0
27 number_of_virtual_machines ........: 0
28 num_of_file_systems_with_protection_policy : 0
29 num_of_import_sessions ............: 0
30 num_of_migration_sessions .........: 0
31 num_of_replication_rules ..........: 0
32 num_of_replication_sessions .......: 0
33 num_of_snapshot_rules .............: 1
34 num_of_source_arrays ..............: 0
35 min_percent_endurance_remaining ...: None
36 num_of_total_alerts ...............: 9
37 physical_mtu ......................: 1500
38
39
40 ****************************************************************
41 Appliance Information
42 ****************************************************************
43 +------------------------+----+------------------+---------+
44 | name                   | id | mode             | mode    |
45 | XXXABCSTORE1-appliance-1 | A1 | PowerStore 7000T | Unified |
46 +------------------------+----+------------------+---------+
```

FIG. 6

```
"Cluster Information" : [
    {
        "cluster_id": "PSxxx1234y2z8q",
        "cluster_name": "XXXABCSTORE1",
        "cluster_state": "CONFIGURED",
        "release_version": "2.1.0.0",
        "compatibility_level": "15",
        "is_encryption_enabled": "True",
        "master_application_id": "A1",
        "num_of_current_active_alerts": "8",
        "num_of_host_mapping": "2",
        "num_of_mappings": "243",
        "num_of_vol_mapping": "243",
        "num_of_file_systems": "0",
        "num_of_nfs_export": "0",
        "num_of_smb_shares": "0",
        "number_of_vcenters": "0",
        "number_of_virtual_machines": "0",
        "num_of_file_systems_with_protection_policy": "0"
        "num_of_import_sessions": "0",
        "num_of_migration_session": "0",
        "num_of_replication_rules": "0",
        "num_of_replication_sessions": "0",
        "num_of_snapshot_rules": "1",
        "num_of_source_arrays": "0",
        "min_percent_endurance_remaining": "None",
        "num_of_total_alerts": "9",
        "pysical_mtu": "1500"
    }
],
"Appliance Information": [
    {
        "name": "XXXABCSTORE1-appliance-1",
        "id": "A1",
        "model": "PowerStore 7000T",
        "mode": "Unified",
        "serial_number": "ABC0xx0y000000",
        "service_tag": "1xx0123",
        "express_service_code": "xxx123yyzz",
        "part_number": "123-xxx-123",
        "software_version": "2.1.0.0",
        "build_id": "123xxyy"
    }
],
```

| | TEE_id | created | priority | component | version | platform | model |
|---|---|---|---|---|---|---|---|
| 0 | TEE-123x | 2021-12-13T09:33:59:000-0500 | P1 | Upgrade/NDU | 2.0.1.1-1471924 | PowerStore T | PowerStore 1000 |
| 1 | TEE-123x | 2022-12-05T05:38:05:000-0500 | P2 | Upgrade/NDU | 2.0.1.0-1452126 | PowerStore T | PowerStore 3000 |
| 2 | TEE-124x | 2022-01-13T13:08:02.000-0500 | P2 | Host & Volume Group | 2.0.1.3-1538564 | PowerStore T | PowerStore 500 |
| 3 | TEE-125x | 2022-01-14T09:28:16:000-0500 | P2 | NVRAM | 2.0.0.0-1397847 | PowerStore T | PowerStore 1000 |
| 4 | TEE-126x | 2022-01-19T16:38:19:000-0500 | P1 | Node | 1.0.4.0.5.006 | PowerStore X | PowerStore 1000 |
| ... | ... | ... | ... | ... | ... | ... | ... |
| 1819 | TEE-127x | 2023-03-14T00:40:50:000-0400 | P3 | GUI/User Experience | 3.2.0.1-1860013 | PowerStore T | PowerStore 500 |
| 1820 | TEE-128x | 2023-03-14T03:51:46:000-0400 | P3 | Data/Metadata integrity | 3.2.0.1-1860013 | PowerStore T | PowerStore 3000 |
| 1821 | TEE-129x | 2023-03-14T05:25:42:000-0400 | P3 | Alerts & Events | 3.2.0.0-1828615 | PowerStore T | PowerStore 1000 |
| 1822 | TEE-130x | 2023-03-14T05:49:37:000-0400 | P2 | GUI/User Experience | 3.2.0.1-1860013 | PowerStore T | PowerStore 500 |
| 1823 | TEE-131x | 2023-03-14T09:27:24:000-0400 | P2 | Data/Metadata integrity | 3.2.0.1-1860013 | PowerStore T | PowerStore 7000 |

1824 rows x 90 columns

FIG. 7 cont.

| impact_level | impact_type | _ | snap_group_tot_unique_TB | vol_from_host_cnt | vol_from_host_tot_defined_TB |
|---|---|---|---|---|---|
| High | Not DU/DL | _ | 14.51 | 140.0 | 412.25 |
| Medium | Not DU/DL | _ | 99.85 | 198.0 | 644.85 |
| Low | Not DU/DL | _ | 1.31 | 47.0 | 143.50 |
| Medium | Not DU/DL | _ | 3.41 | 13.0 | 66.09 |
| High | Not DU/DL | _ | 45.26 | 0.0 | 0.0 |
| _ | _ | _ | _ | _ | _ |
| Low | No impact | _ | 0.02 | 6.0 | 90.00 |
| Low | No impact | _ | 34.84 | 56.0 | 599.00 |
| Low | No impact | _ | 19.36 | 12.0 | 90.10 |
| Medium | GUI unavailable | _ | 3.29 | 6.0 | 48.00 |
| Medium | No impact | _ | 7.70 | 112.0 | 1126.00 |

*FIG. 8*

| | version | platform | model | app_is_healthy | app_mode | app_model | app_version | cap_logical_TB |
|---|---|---|---|---|---|---|---|---|
| 0 | 10 | 0 | 0 | 0 | 1 | 0 | 3 | 36.90 |
| 1 | 9 | 0 | 2 | 0 | 0 | 3 | 9 | 347.90 |
| 2 | 13 | 0 | 4 | 0 | 0 | 8 | 11 | 3.70 |
| 3 | 8 | 0 | 0 | 0 | 1 | 0 | 8 | 19.90 |
| 4 | 3 | 1 | 0 | 0 | 1 | 1 | 3 | 45.10 |
| ... | ... | ... | ... | ... | ... | ... | ... | ... |
| 1482 | 24 | 0 | 4 | 0 | 0 | 8 | 19 | 0.04 |
| 1483 | 24 | 0 | 2 | 0 | 0 | 3 | 19 | 137.40 |
| 1484 | 23 | 0 | 0 | 0 | 1 | 0 | 19 | 35.60 |
| 1485 | 24 | 0 | 4 | 0 | 0 | 8 | 19 | 9.20 |
| 1486 | 24 | 0 | 7 | 0 | 0 | 10 | 19 | 335.80 |

1487 rows × 77 columns

| cap_physical_TB_total | cap_physical_TB_used | snap_for_vol_tot_TB | snap_group_cnt |
|---|---|---|---|
| 16.96 | 15.64 | 0.0 | 35.0 |
| 361.84 | 118.56 | 0.0 | 195.0 |
| 34.25 | 2.90 | 630.0 | 36.0 |
| 51.53 | 6.90 | 0.0 | 20.0 |
| 62.99 | 46.05 | 0.0 | 21.0 |
| — | — | — | — |
| 18.63 | 0.04 | 0.0 | 11.0 |
| 91.63 | 41.75 | 0.0 | 38.0 |
| 39.92 | 20.99 | 0.0 | 19.0 |
| 12.74 | 3.95 | 24.0 | 13.0 |
| 62.89 | 15.44 | 0.0 | 68.0 |

DETERMINING CONFIGURATIONS TO BE USED IN SYSTEM TESTING PROCESSES USING MACHINE LEARNING TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In connection with product testing, the number of test configurations can be overwhelmingly large, particularly with respect to configuration variables such as different hardware versions, different software components, different product features and related interactions, product permutations, etc. Conventional testing methods commonly rely on subject matter experts making manual limited configuration choices from larger sets of configuration options, a process which can be resource-intensive and error-prone, and which can lead to reductions in product quality.

SUMMARY

Illustrative embodiments of the disclosure provide techniques for determining configurations to be used in system testing processes using machine learning techniques.

An exemplary computer-implemented method includes obtaining, from multiple data sources, configuration information associated with at least one system, and filtering out a subset of the configuration information based at least in part on at least one user request related to testing of at least a portion of the at least one system. The method also includes determining at least a portion of the subset of the configuration information to be used in the testing of the at least a portion of the at least one system by processing the subset of the configuration information using one or more machine learning techniques. Further, the method additionally includes performing one or more automated actions based at least in part on the determined at least a portion of the subset of the configuration information to be used in the testing.

Illustrative embodiments can provide significant advantages relative to conventional testing methods. For example, problems associated with resource-intensive and error-prone configuration selection processes are overcome in one or more embodiments through automatically determining configurations to be used in system testing processes using machine learning techniques.

These and other illustrative embodiments described herein include, without limitation, methods, apparatus, systems, and computer program products comprising processor-readable storage media.

BRIEF DESCRIPTION OF THE DRAWINGS

FIG. 2 shows example pseudocode for converting a configuration text file into a configuration JavaScript Object Notation (JSON) file using a configuration finder in an illustrative embodiment.

FIG. 5 shows an example auto-generated configuration file in an illustrative embodiment.

FIG. 6 shows example pseudocode for parsing text files into a JSON format file in an illustrative embodiment.

FIG. 7 shows an example aggregated data table for different configurations with different fields in an illustrative embodiment.

FIG. 8 shows an example dataset after data cleaning in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
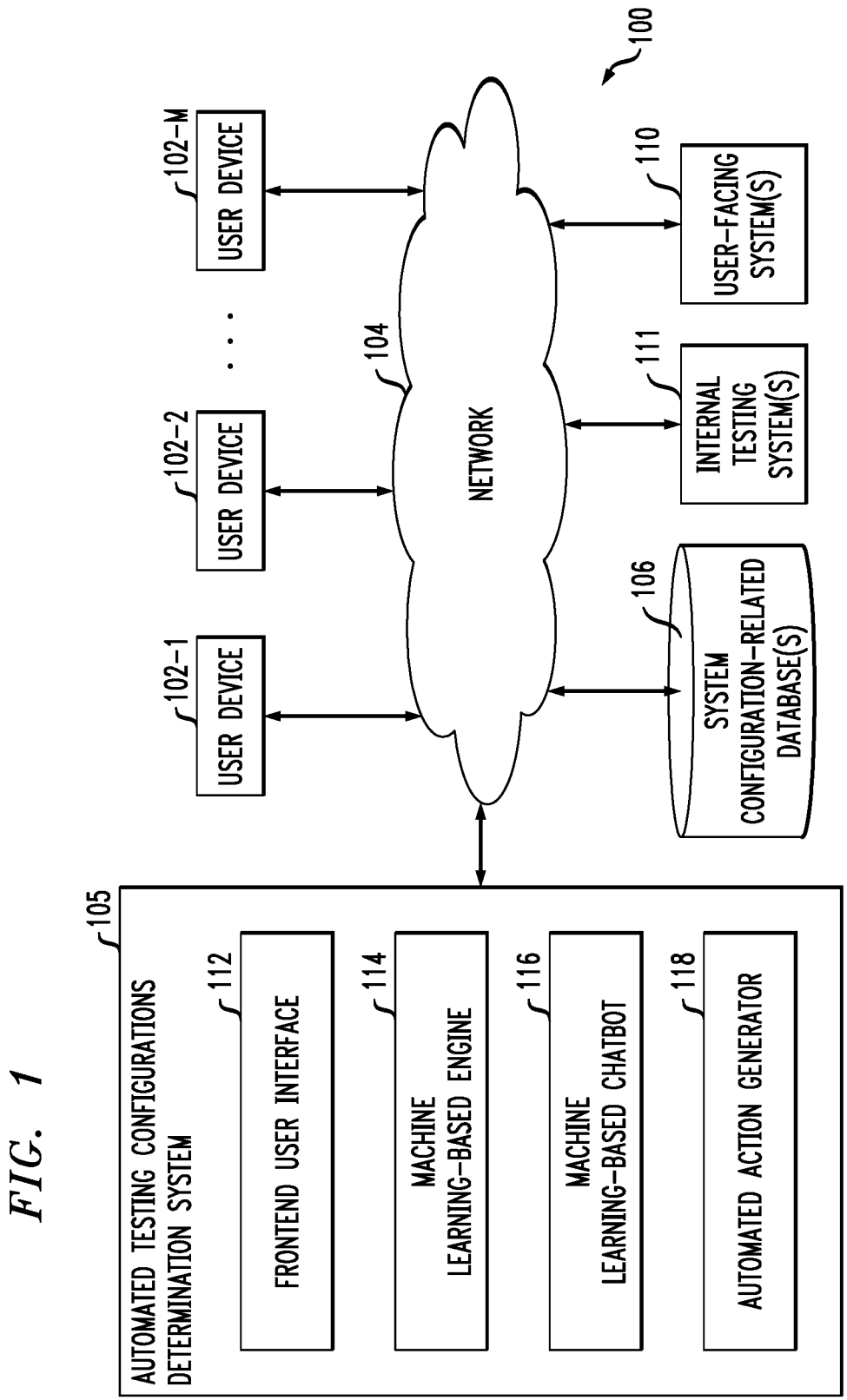
FIG. 1 shows an information processing system configured for determining configurations to be used in system testing processes using machine learning techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated testing configurations determination system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated testing configurations determination system 105 can have one or more associated system configuration-related databases 106 configured to store data pertaining to system-related applications, machine learning models used in making testing configurations determinations, system-related defects, user request, etc.

The system configuration-related database(s) 106 in the present embodiment is implemented using one or more storage systems associated with automated testing configurations determination system 105. Such storage systems can comprise any of a variety of different types of storage including network-attached storage (NAS), storage area networks (SANS), direct-attached storage (DAS) and distributed DAS, as well as combinations of these and other storage types, including software-defined storage.

Also associated with automated testing configurations determination system 105 are one or more input-output devices, which illustratively comprise keyboards, displays or other types of input-output devices in any combination. Such input-output devices can be used, for example, to support one or more user interfaces to automated testing configurations determination system 105, as well as to support communication between automated testing configurations determination system 105 and other related systems and devices not explicitly shown.

Additionally, automated testing configurations determination system 105 in the FIG. 1 embodiment is assumed to be implemented using at least one processing device. Each such processing device generally comprises at least one processor and an associated memory, and implements one or more functional modules for controlling certain features of automated testing configurations determination system 105.

More particularly, automated testing configurations determination system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated testing configurations determination system 105 to communicate over the network 104 with the user devices 102, and illustratively comprises one or more conventional transceivers.

The automated testing configurations determination system 105 further comprises frontend user interface 112, machine learning-based engine 114, machine learning-based chatbot 116, and automated action generator 118.

It is to be appreciated that this particular arrangement of elements 112, 114, 116 and 118 illustrated in the automated testing configurations determination system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for determining configurations to be used in system testing processes using machine learning techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of automated testing configurations determination system 105, system configuration-related database(s), user-facing system(s) 110, and internal testing system(s) 111 can be on and/or part of the same processing platform.

An exemplary process utilizing elements 112, 114, 116 and 118 of an example automated testing configurations determination system 105 in computer network 100 will be described in more detail with reference to the flow diagram of FIG. 10.

Accordingly, at least one embodiment includes implementing a machine learning-based approach to automatically collect configuration information of one or more products from one or more different systems, including, e.g., one or more user-facing systems (e.g., element(s) 110 in FIG. 1) and one or more internal testing systems (e.g., element(s) 111 in FIG. 1), and to transform at least a portion of such configuration information into sets of test configurations that can be used in connection with related product testing (e.g., used directly by a primary storage system and solutions organization). As used herein, user-facing systems can include systems which collect test-related data from user devices, and internal testing systems can include systems wherein test developers upload test configurations, test logs, test results, etc.

Such embodiments as described above and herein can include significantly reducing testing-related costs in terms of equipment, operational expenses, time and/or human effort. Further, such an embodiment can additionally include increasing confidence associated with testing by using a variety of data such as, e.g., user data, historical product-related data, etc.

As further detailed herein, one or more embodiments include generating and/or implementing a machine learning-based engine or microservice and a machine learning-based bot. In such an embodiment, the machine learning-based engine or microservice, also referred to herein as a "numbine" engine, runs on one or more containers and can find, parse, clean, and cluster configuration information (e.g., configuration files) from different systems (e.g., different backlog systems). Also, in one or more embodiments, the machine learning-based engine can encompass and/or use one or more machine learning techniques such as, for example, at least one bisecting K-means algorithm (implemented, e.g., using a Python package scikit-learn).

Additionally, in at least one embodiment, the machine learning-based bot, also referred to herein as a "numbine" bot, can receive user queries (e.g., from at least one website) and communicate with a machine learning-based engine to determine and/or obtain output relevant to the user queries on-demand. Further, in at least one embodiment, such a machine learning-based bot can be integrated into a machine learning-based frontend (also referred to herein as a "numbine" frontend). In such an embodiment, the machine learning-based frontend can include one or more frontend webpages wherein users can log-in, choose the product(s) they want to generate test configurations for, and filter data used for generating the test configurations, including selecting the data source(s) from one or more internal testing systems, selecting the specific software versions, selecting the time range of the data, etc.

Accordingly, one or more embodiments include implementing a machine learning based engine which collects (e.g., continuously collects) data (e.g., historical data and current data) from one or more user focusing systems, and one or more internal testing systems using at least one configuration finder and/or data collector. In such an embodiment, the configuration finder and/or data collector includes a Python module that has no external dependencies, and wherein the module can periodically log-in to one or more test repositories (e.g., internal or external testing systems), compare a test repository with a central database for new test configurations that are not yet stored in the database, and pass these configurations to a configuration parser and then to a configuration storer, as further described herein.

The machine learning-based engine can then store at least a portion of such collected data in at least one database (e.g., a "numbine" central database), parse and/or filter out configuration information (e.g., storage configuration information) therefrom using a parser, and maintain the parsed and/or filtered out configuration information in at least one format (e.g., at least one JSON file) for further processing. Also, in one or more embodiments, the configuration parser includes a Python module that has no external dependencies, wherein the module uses regular expression (RE) to read-in and/or process a plain text configuration file, scan the file line-by-line to parse the file for one or more new tables, one or more new rows and/or one or more columns (e.g., depending on the orientation of the table), and storing the tables and corresponding data into at least one JSON file.

FIG. 2 shows example pseudocode for converting a configuration text file into a configuration JSON file using a configuration finder in an illustrative embodiment. In this embodiment, example pseudocode 200 is executed by or under the control of at least one processing system and/or device. For example, the example pseudocode 200 may be viewed as comprising a portion of a software implementation of at least part of automated testing configurations determination system 105 of the FIG. 1 embodiment.

The example pseudocode 200 illustrates a configuration finder reading-in a plain text file (.txt) (such as the example depicted in FIG. 5), creating a Python list to hold the information for this text file, and scanning the file line-by-line. At each iteration, the configuration finder checks to determine if a new table is to be entered. If so (i.e., a new table is to be entered), the configuration finder appends the previous Python dictionary to the list, uses RE to find the table name, creates a Python dictionary to hold the information for this table, and continues to the next iteration. If not (i.e., a new table is not to be entered), the configuration finder uses RE to find the column and/or row name(s) (depending on table orientation), uses RE to find the column and/or row value(s) (depending on table orientation), and stores the key-value pair into the current Python dictionary. Subsequently, as illustrated in example pseudocode 200, the configuration finder stores the Python dictionary into a JSON file.

It is to be appreciated that this particular example pseudocode shows just one example implementation of converting a configuration text file into a configuration JSON file using a configuration finder, and alternative implementations can be used in other embodiments.

To reduce the number of testable configurations, one or more embodiments include implementing multiple subsystems which include a frontend, a data collector, a machine learning-based engine and a machine learning-based bot. In such an embodiment, the frontend can include a web-based graphical user interface (GUI) which can be used by a user to select a number (e.g., a minimum number) of configurations from at least one prioritized outcome using the machine learning-based engine and the machine learning-based bot. Additionally, the data collector subsystem automatically pulls information related to configurable parameters from different systems (e.g., Jira systems, qTest, CloudIQ, InsideIQ, etc.), parses at least a portion of such information (e.g., configuration parameter information) from the collected data, and stores the parsed information into at least one database.

Accordingly, using one or more clustering models (and/or one or more other types of unsupervised models), at least one embodiment includes classifying configurations into different groups based at least in part on configuration similarities. That is, the configurations inside a group are likely to share commonalities, and are therefore more likely to reproduce the same bug(s) and/or issue(s). Subsequently, such an embodiment can include selecting the most-centered configurations (using, e.g., centroids) from each group as the representative(s) of each group, and prioritizing the remaining configurations in each group by measuring the distance to the corresponding centroid(s), yielding a list of configurations ranked by similarities (wherein, e.g., shorter distance values corresponding to greater similarity and higher priority). This compact list can cover, for example, typical scenarios among the input configuration files and therefore significantly reduce the effort for the system testing team.

Also, in such an embodiment, the machine learning-based engine creates, cleans and updates at least one configuration dataset, clustering configuration information based at least in part on one or more similarities, and prioritizes at least a portion of the configuration information (such as detailed above). At least one embodiment includes visualizing and/or illustrating the at least one configuration dataset to verify data distribution. Such an embodiment can include building and/or implementing a clustering model and using an elbow method with distortion scores in connection with a K-Means unsupervised algorithm to determine the optimal number (K) of clusters into which the data is clustered.

As further detailed herein, in such an embodiment, the machine learning-based bot uses one or more natural language processing (NLP) techniques and a combination of rule-based techniques and keyword-based techniques. The machine learning-based bot collects user requests (e.g., simple and/or complex queries) through a frontend, processes the requests to interact with the machine learning-based engine, and responds to the user requests (e.g., with the optimal number of configurations for a particular testing use case).

Additionally, in such an embodiment, the machine learning-based engine runs on one or more docker container(s) and includes a configuration finder component, a storing component, a parser, an aggregator, as well as clustering and prioritization processes to determine and/or provide an efficient and optimal set of configurations to validate products (e.g., storage products) during one or more development phases.

Accordingly, one or more embodiments include collecting data from various systems (e.g., user-facing systems and internal systems) to formulate configuration information datasets, and using such datasets to train at least one artificial intelligence model (in connection with a machine learning-based engine) using an unsupervised machine learning algorithm (e.g., a K-Means algorithm). The at least one artificial intelligence model, once trained, can process input data related to one or more product testing instances and generate and/or output an optimal number (and identification) of configurations to be used in connection with testing the one or more products and/or validating user issues, providing configurations recommendation for future releases, etc.

Figure 3:
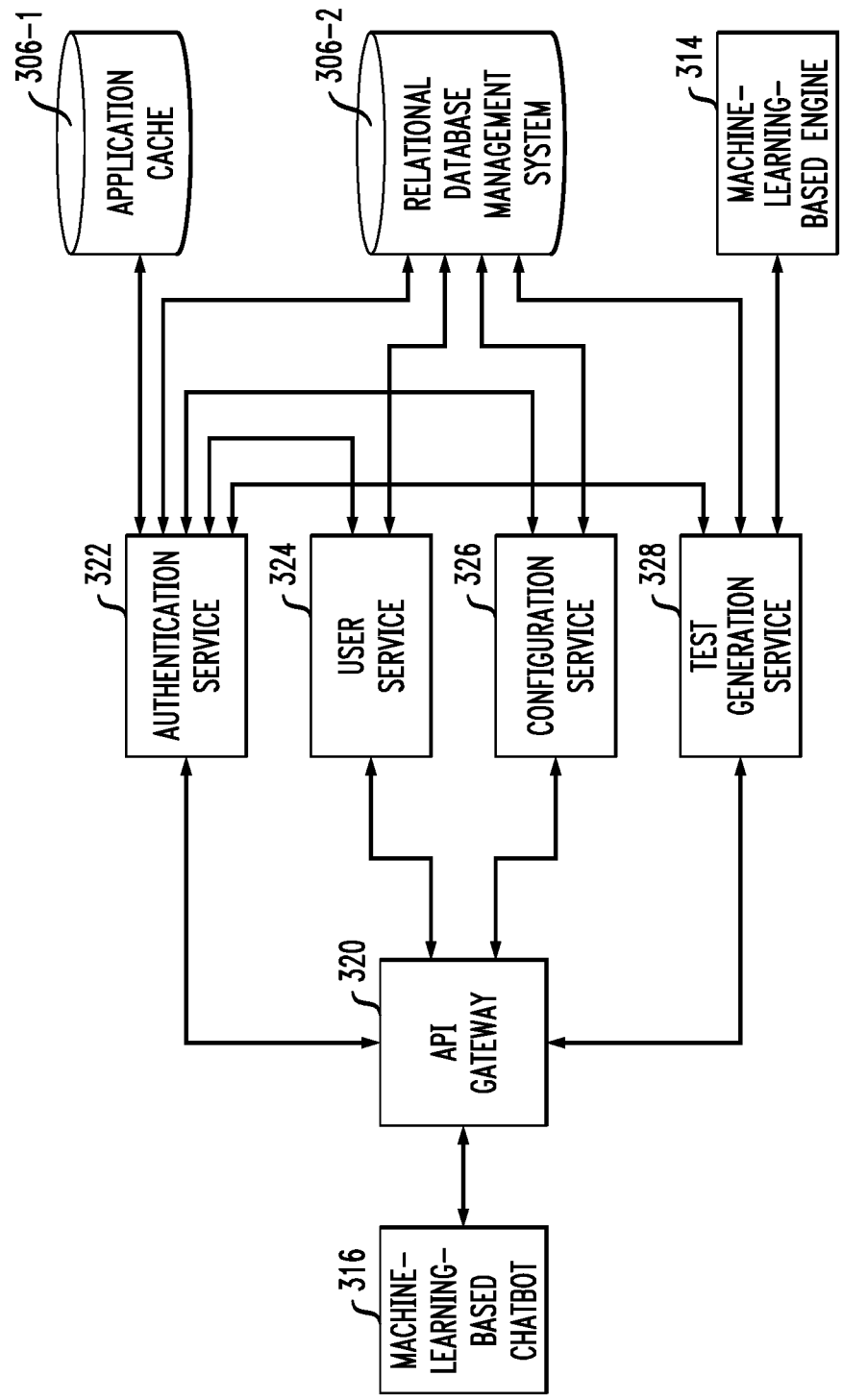
FIG. 3 shows an example workflow in an illustrative embodiment.

FIG. 3 shows an example workflow in an illustrative embodiment. By way of illustration, FIG. 3 depicts machine learning-based chatbot 316 (also referred to herein as a numbine bot), which interacts with application programming interface (API) gateway 320, which in turn interacts with frontend systems and/or services such as authentication service 322, user service 324, configuration service 326, and test generation service 328. As also depicted in FIG. 3 authentication service 322 interacts with application cache 306-1, user service 324, relational database management system 306-2, configuration service 326, and test generation service 328. Additionally, user service 324 interacts with authentication service 322 (as noted above) and relational database management system 306-2. Configuration service 326 similarly interacts with authentication service 322 (as noted above) and relational database management system 306-2. Further, and as additionally detailed herein, test generation service 328 interacts with authentication service 322 (as noted above), relational database management system 306-2, and machine learning-based engine 314 (also referred to herein as a numbine engine).

Figure 4:
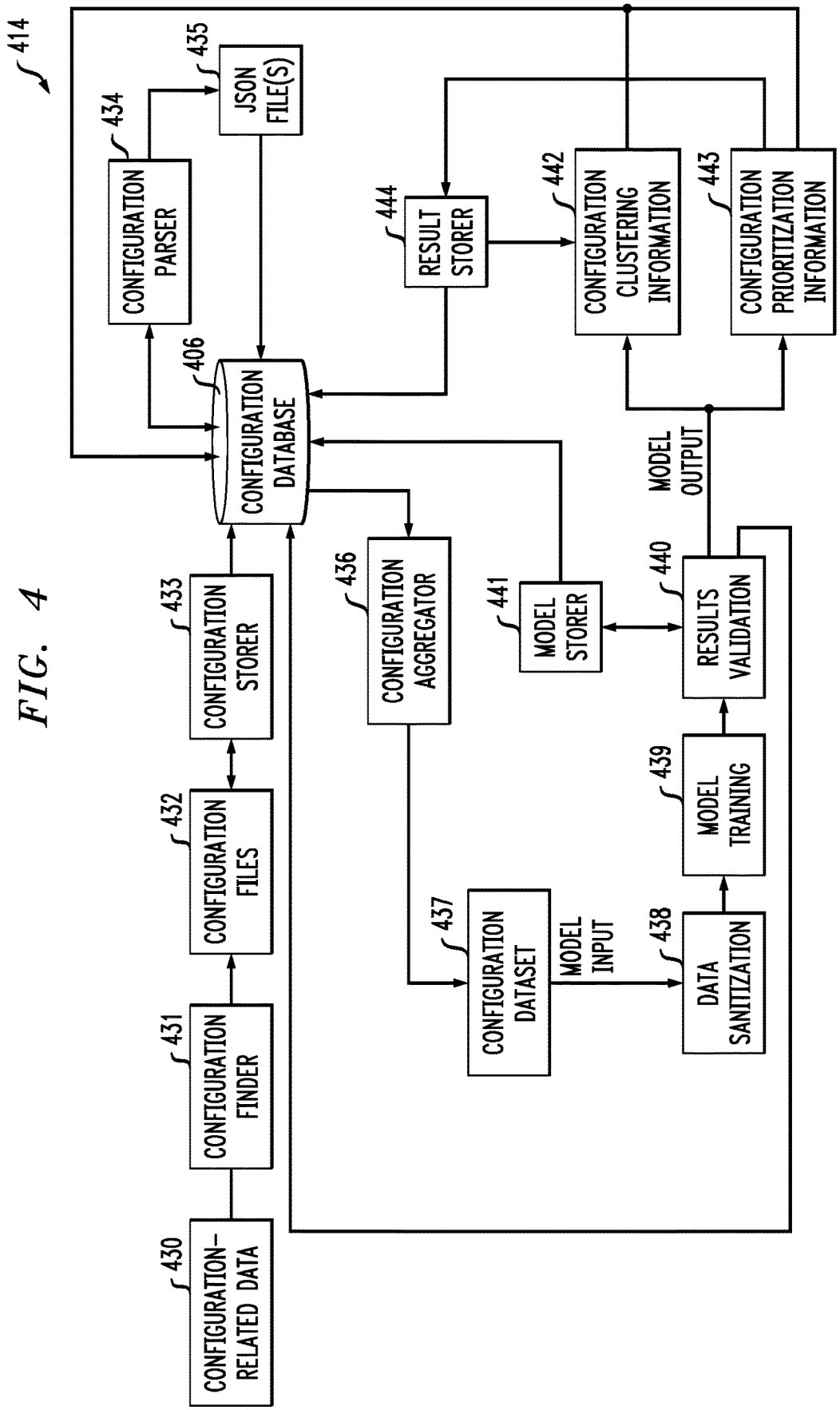
FIG. 4 shows example machine learning-based engine architecture in an illustrative embodiment.

FIG. 4 shows example machine learning-based engine architecture in an illustrative embodiment. By way of illustration, FIG. 4 depicts multiple processes and components associated with implementation of the machine learning-based engine 414 (also referred to herein as a numbine engine). Such processes include, for example, a data gathering process. As depicted in the example embodiment of FIG. 4, the data gathering process can include collecting configuration-related data 430, finding raw configuration files 432 (e.g., in plain text) therein using a configuration finder 431, parsing the raw configuration files 432 into one or more JSON files 435 using a configuration parser 434, and storing both formats of data in configuration database 406 using configuration storer 433. In at least one embodiment the configuration storer 433 includes a Python module with no external dependencies, wherein the module can connect to a central database and store the raw configurations (e.g., .txt files) and related JSON configurations therein.

Another process carried out by machine learning-based engine 414 includes a machine learning process that includes processing model input in the form of a configuration dataset 437, generated and/or compiled using configuration aggregator 436. Once the configuration files are transformed into a JSON format and stored in a database, at least one embodiment can include searching for the configurations that meet certain requirements and aggregate such configurations into a tabular form that can be directly fed into one or more machine learning models (e.g., machine learning-based engine 414). For this purpose, such an embodiment includes using configuration aggregator 436 to perform the filtration and aggregation tasks. Specifically, the configuration aggregator 436 first filters out all of the JSON files required by the end user (e.g., all of the configuration files for a specific model with a specific software version), then concatenates all of the resulting JSON files into a table wherein each row represents a single JSON file and each column represents a single field from a table. To improve model performance, one or more embodiments can include only collecting fields of interest (e.g., hardware model, impact type, disk usage, etc.), while ignoring other fields.

Additionally, such processes as detailed above and in connection with FIG. 4 can include performing data sanitization in step 438 on the configuration dataset 437, training the machine learning model (of machine learning-based engine 414) in step 439 using at least a portion of the sanitized data, and validating results (e.g., yielded optimal configurations) generated by the trained model in step 440 (e.g., using one or more data visualization techniques).

As also detailed herein, portions of the machine learning model can be stored, using model storer 441, in configuration database 406. Additionally, model output can be parsed and/or separated into configuration clustering information 442 and configuration prioritization information 443, and stored, using result storer 444, into configuration database 406. In one or more embodiments, model storer 441 and result storer 444 are Python modules with no external dependencies, wherein the modules serialize Python objects and store them into a central database for later use.

FIG. 5 shows an example auto-generated configuration file 500 in an illustrative embodiment. As detailed herein, in one or more embodiments, a machine learning-based engine (also referred to as a numbine engine) process includes data gathering, which can include collecting actual configuration files from different systems (e.g., one or more user-facing systems, one or more internal testing systems, etc.). By way merely of illustration, the example embodiment depicted in FIG. 5 includes using a user-facing issue tracking system, wherein each ticket in the system has a unique path on a server that stores the information filed by the user (which can include, e.g., the data collection (DC) folder for all the system information collected in connection with a system crash). Such an issue tracking system can, e.g., automatically collect essential items associated with the system in question from different files inside the DC folder and concatenate them into a single configuration file that can contain multiple different tables and/or rows of information (e.g., cluster information, appliance information, networking information, host-volume mapping information, etc.) However, such files can change over time, for example, as users file new DCs to generate new configuration files and/or a server deletes all of the data after a corresponding ticket is resolved. Accordingly, one or more embodiments include implementing (such as detailed, for example, in connection with FIG. 4) a configuration finder and a configuration storer to periodically scan relevant storage sources for newly added configuration files and store them in a central database, respectively.

As such, example auto-generated configuration file 500 depicted in FIG. 5 illustrates a snippet of a raw test configuration file (e.g., a .txt file) gathered from one or more test repositories that will be parsed line-by-line by a configuration parser to generate its JSON version. Additionally, as depicted in FIG. 5 and in accordance with one or more embodiments, all of the lines starting with "num_of_" highlight important information in connection with generating test configurations.

FIG. 6 shows example pseudocode for parsing text files into a JSON format file in an illustrative embodiment. In this embodiment, example pseudocode 600 is executed by or under the control of at least one processing system and/or device. For example, the example pseudocode 600 may be viewed as comprising a portion of a software implementation of at least part of automated testing configurations determination system 105 of the FIG. 1 embodiment.

The example pseudocode 600 illustrates a configuration parser generating a JSON file using a text configuration file such as illustrated, e.g., in FIG. 5. Such an embodiment can include implementing a regular expression-based configuration parser to parse the text files into JSON format without losing any information. To do that, each table is converted into a unique primary key, and each row or column, depending on the orientation of the table, is converted into a unique secondary key. The JSON file can significantly simplify processes of data cleaning and model training, and one or more additional fields can be added into the JSON files (such as, e.g., ticket identifier (ID), ticket title, identification of the component that caused the crash, etc.). In at least one embodiment, a central database backs up the generated JSON file for future use and/or reuse.

It is to be appreciated that this particular example pseudocode shows just one example implementation of parsing text files into a JSON format file, and alternative implementations can be used in other embodiments.

FIG. 7 shows an example aggregated data table 700 for different configurations with different fields in an illustrative embodiment. As detailed herein, a machine learning-based engine (also referred to as a numbine engine) process, in one or more embodiments, can include data filtering. Once configuration files are transformed into JSON format and stored in a database, such an embodiment can include searching the stored data for configuration files that meet one or more predetermined requirements, and aggregating the identified configuration files into a tabular form that can be directly fed into one or more machine learning models. Such an embodiment (as detailed, e.g., in FIG. 4) includes using a configuration aggregator to perform the filtration and aggregation tasks. The configuration aggregator can, for example, filter out the JSON files required by at least one end user (e.g., all of the configuration files for a specific model with a specific software version), then concatenate the resulting JSON files into a table wherein each row of the table represents a single JSON file and each column in the table represents a single field. To improve model performance, at least one embodiment includes only collecting fields of interest (e.g., hardware model, impact type, disk usage). Aggregated data table 700 in the example embodiment of FIG. 7 depicts 1824 different configurations (rows) with 90 different fields (columns).

FIG. 8 shows an example dataset 800 after data cleaning in an illustrative embodiment. As also detailed herein, a machine learning-based engine (also referred to as a numbine engine) process, in one or more embodiments, can include data cleaning. Once tabular data is obtained and/or generated (such as detailed, for example, in connection with FIG. 7), one or more embodiments include performing data cleaning to sanitize at least a portion of the data and potentially improve model performance. Such an embodiment can include determining the data distribution of each column and removing some of the data that do not contribute significantly to the model fitting (such as, e.g., metadata fields for the ticket, fields with too many missing values and/or too many identical values, etc.). Then, the rows that contain any null values are removed to avoid and/or reduce data interpolation and improve model stability. In connection with data formats, such an embodiment can include preserving the integers and the floats, and converting all of the categorical strings into integers with a label encoder. Example dataset 800 in the example embodiment of FIG. 8 contains 1487 configurations (rows) with 77 fields (columns).

Using, for instance, example dataset 800, at least one embodiment can include determining that there are too many fields (columns) with un-equal importance; that is, some fields (e.g., the number of snapshots in the system, the number of replication sessions, etc.) could be more revealing than others (e.g., the hardware model number) in the sense of indicating a potential issue. Therefore, such an embodiment can include using Principal Component Analysis (PCA) to reduce the dimensionality (e.g., the number of columns) and prioritize the fields that have greater variance. Such techniques can also reduce the noise in the data and overfitting with respect to the model.

As additionally detailed herein, a machine learning-based engine process in one or more embodiments can include model training. As depicted in the example embodiment of FIG. 4, after performing data sanitization, the dataset can be fed into and/or processed by one or more machine learning models. Such processing can include using one or more unsupervised models (e.g., clustering models) to classify the configurations into different groups based on one or more similarities. For example, the configurations inside a group and/or classification can share many features and/or commonalities, such that the configurations are more likely to produce and/or reproduce the same issue(s). Such an embodiment can also include selecting the most-centered configurations (e.g., centroids) from each group and/or classification as the representative(s) of that group and/or classification, and prioritize the remaining configurations in each group and/or classification by measuring the distance to the corresponding centroids, yielding a simplified list of configurations ranked by similarities. This list, in one or more embodiments, can cover most typical scenarios among the input configuration files and therefore significantly reduce effort in connection with system testing.

Such processing can also include using one or more supervised models to train the one or more machine learning models against the priority, severity, and/or component that caused the issue(s) to directly triage the ticket(s) and/or provide one or more insights about a possible solution.

Referring again to the above-noted embodiments which include using one or more unsupervised models (e.g., clustering models), multiple algorithms can be trained, such as, for example, at least one K-Means clustering algorithm, at least one agglomerative clustering algorithm, at least one density-based spatial clustering of applications with noise (DBSCAN) algorithm, and at least one bisecting K-Means clustering algorithm. At least one embodiment includes using and training at least one bisecting K-Means algorithm, which clusters data in a non-overlapping manner, is resilient to outliers, and reduces computational costs. Also, in such an embodiment, using the at least one bisecting K-Means algorithm, the number of clusters can be directly controlled, which is suitable for use cases wherein the end users may ask for any specific number of configurations.

In one or more embodiments, a machine learning-based engine process can also include model tuning. For example, when the end user specifies the desired number of configurations, the machine learning-based engine attempts to classify the dataset into the same number of clusters, then chooses the most-centered configurations from each cluster as representative(s). Alternatively, when the end user does not specify the desired number of configurations, the machine learning-based engine can automatically decide and/or determine the best number of clusters to yield as the representative configurations. In at least one embodiment, the machine learning-based engine uses the elbow method to decide and/or determine the best number of clusters to yield as the representative configurations, as the elbow point indicates that the model fits the data best at this number of clusters.

By way merely of example, to optimize a bisecting K-Means model for a user request which does not include a specification of the desired number of configurations, the model can be tuned using the elbow method, which can fit the model with a range of values for the number of clusters and determine and/or identify an infection point (the "elbow") on the curve of the distortion score (e.g., the sum of squared distances from each point to its corresponding centroids) as the best value.

Figure 9:
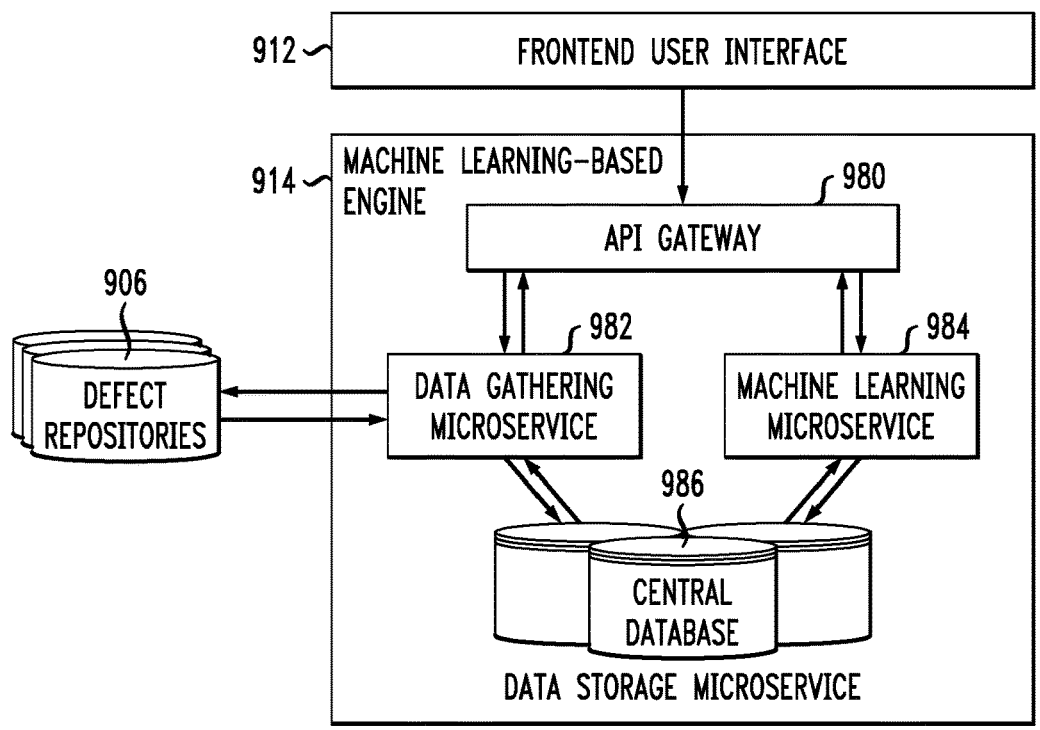
FIG. 9 shows an example machine learning-based engine process workflow in an illustrative embodiment.

FIG. 9 shows an example machine learning-based engine process workflow in an illustrative embodiment. By way of illustration, FIG. 9 depicts machine learning-based engine 914 interacting with frontend user interface 912 and defect repositories 906. In an example embodiment such as depicted in FIG. 9, machine learning-based engine 914 is designed to be microservice-based to enable scaling for different data sources, different sized datasets, and/or redundant data backups. As illustrated in FIG. 9, machine learning-based engine 914 can contain multiple microservices including API gateway 980, data gathering microservice 982, machine learning microservice 984, and data storage microservice 986.

API gateway 980 can include a server that handles requests from the frontend user interface 912 by routing such requests to data gathering microservice 982 and/or machine learning microservice 984. Data gathering microservice 982 finds and gathers configuration files from defect repositories 906 (using a configuration finder), parses the configuration files into one or more JSON files (using a configuration parser), and stores the parsed configuration files in a central database (using a configuration storer) in connection with data storage microservice 986. Such a data gathering process can run automatically and/or can be triggered or initiated via user request.

Machine learning microservice 984 filters and aggregates configurations from a central database (using a configuration aggregator) in connection with data storage microservice 986, cleans the data (using a machine learning data cleaner), then trains and/or tunes one or more machine learning models (using a machine learning model trainer) to determine and/or select the most representative configurations per user requests. Data storage microservice 986 manages the central database to store information used by the machine learning-based engine 914, which includes the original text files, the generated JSON files, ticket metadata, etc. In one or more embodiments, Data storage microservice 986 also performs data replications to improve data integrity.

It is to be appreciated that some embodiments described herein utilize one or more artificial intelligence models. It is to be appreciated that the term "model," as used herein, is intended to be broadly construed and may comprise, for example, a set of executable instructions for generating computer-implemented recommendations and/or predictions. For example, one or more of the models described herein may be trained to generate recommendations and/or predictions with respect to configurations to be used in testing based on historical data, user inputs, product data, etc., and such recommendations and/or predictions can be used to initiate one or more automated actions (e.g., automatically initiating product testing operations, automatically training and/or fine-tuning one or more machine learning algorithms, etc.).

Figure 10:
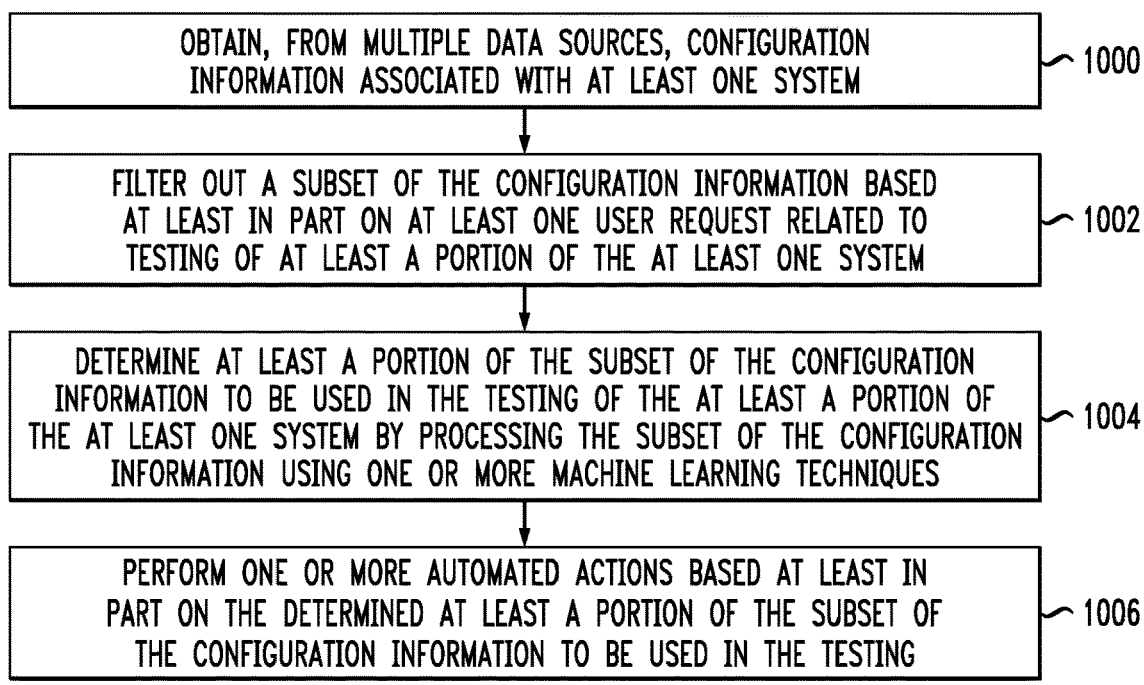
FIG. 10 is a flow diagram of a process for determining configurations to be used in system testing processes using machine learning techniques in an illustrative embodiment.

FIG. 10 is a flow diagram of a process for determining configurations to be used in system testing processes using machine learning techniques in an illustrative embodiment. It is to be understood that this particular process is only an example, and additional or alternative processes can be carried out in other embodiments.

In this embodiment, the process includes steps 1000 through 1006. These steps are assumed to be performed by the automated testing configurations determination system 105 utilizing at least portions of elements 112, 114, 116 and/or 118.

Step 1000 includes obtaining, from multiple data sources, configuration information associated with at least one system. In at least one embodiment, obtaining configuration information from multiple data sources includes periodically searching at least a portion of the multiple data sources to identify one or more new configuration files. In such an embodiment, obtaining configuration information from multiple data sources can include comparing content of the one or more new configuration files to existing configuration information, and storing, in at least one database, each of the one or more new configuration files containing content not matching the existing configuration information.

Additionally or alternatively, in at least one embodiment, the obtained configuration information is in a plain text format, and obtaining configuration information from multiple data sources includes converting at least a portion of the configuration information in the plain text format to a JSON format. Further, obtaining configuration information from multiple data sources can also include obtaining configuration information associated with the at least one system from one or more user-facing data sources and one or more internal system-related data sources.

Step 1002 includes filtering out a subset of the configuration information based at least in part on at least one user request related to testing of at least a portion of the at least one system. In one or more embodiments, filtering out the subset of configuration information includes aggregating the subset of the configuration information into at least one fixed-size table. Additionally or alternatively, in one or more embodiments, the filtering detailed in step 1002 can be carried out using one or more rule-based techniques, via user selection through at least one interface, and/or using one more machine learning techniques (e.g., the one or more machine learning techniques detailed in connection with step 1004 below).

Step 1004 includes determining at least a portion of the subset of the configuration information to be used in the testing of the at least a portion of the at least one system by processing the subset of the configuration information using one or more machine learning techniques. In at least one embodiment, determining at least a portion of the subset of the configuration information includes processing the subset of the configuration information using one or more unsupervised clustering models. In such an embodiment, processing the subset of the configuration information using one or more unsupervised clustering models can include processing the subset of the configuration information using at least one bisecting K-Means algorithm.

Additionally or alternatively, processing the subset of the configuration information using one or more unsupervised clustering models can include clustering the subset of the configuration information into multiple groups based at least in part on one or more similarities across the subset of the configuration information. In such an embodiment, processing the subset of the configuration information using one or more unsupervised clustering models can further include determining, for each of the multiple groups, a centroid as a representative configuration for a given group. Further, in such an embodiment, processing the subset of the configuration information using one or more unsupervised clustering models can also include determining, for at least a portion of the multiple groups, a number of items of the configuration information to be used in the testing by processing the at least a portion of the multiple groups using an elbow method.

Step 1006 includes performing one or more automated actions based at least in part on the determined at least a portion of the subset of the configuration information to be used in the testing. In one or more embodiments, performing one or more automated actions includes automatically outputting, to at least one user associated with the at least one user request, using a machine learning-based chatbot, information identifying the determined at least a portion of the subset of the configuration information to be used in the testing. Additionally or alternatively, performing one or more automated actions can include automatically initiating the testing of the at least one system using the determined at least a portion of the subset of the configuration information. Also, in at least one embodiment, performing one or more automated actions includes automatically training at least a portion of the one or more machine learning techniques using feedback related to the determined at least a portion of the subset of the configuration information.

Accordingly, the particular processing operations and other functionality described in conjunction with the flow diagram of FIG. 10 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically determine configurations to be used in system testing processes using machine learning techniques. These and other embodiments can effectively overcome problems associated with resource-intensive and error-prone configuration selection processes.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 11 and 12. Although described in the context of system 100, these platforms may also be used to implement at least portions of other information processing systems in other embodiments.

Figure 11:
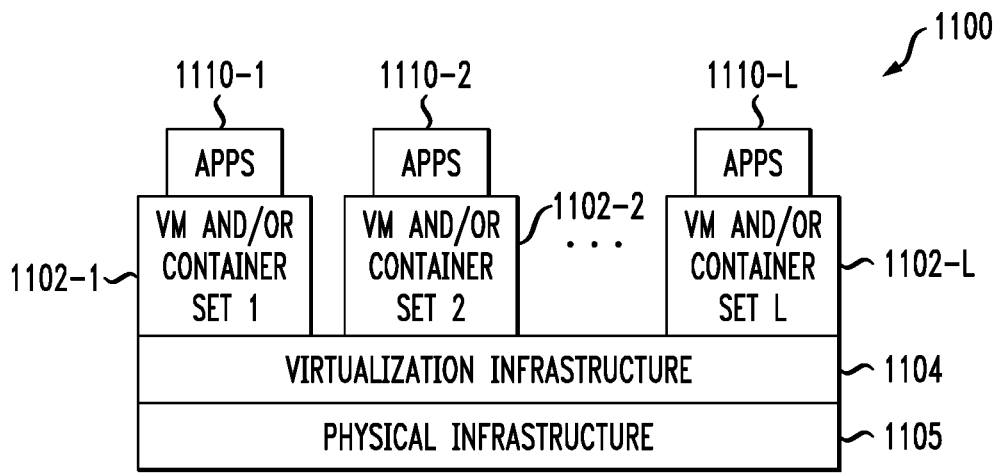
FIGS. 11 and 12 show examples of processing platforms that may be utilized to implement at least a portion of an information processing system in illustrative embodiments.
Figure 12:
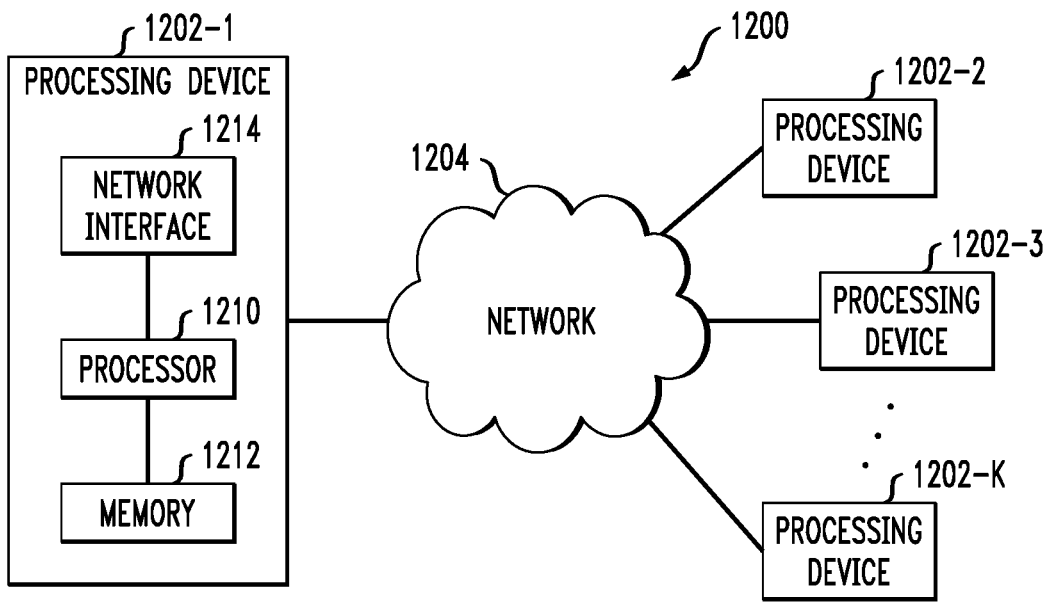

FIG. 11 shows an example processing platform comprising cloud infrastructure 1100. The cloud infrastructure 1100 comprises a combination of physical and virtual processing resources that are utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 comprise respective VMs, respective sets of one or more containers, or respective sets of one or more containers running in VMs. In some implementations of the FIG. 11 embodiment, the VMs/container sets 1102 comprise respective VMs implemented using virtualization infrastructure 1104 that comprises at least one hypervisor.

A hypervisor platform may be used to implement a hypervisor within the virtualization infrastructure 1104, wherein the hypervisor platform has an associated virtual infrastructure management system. The underlying physical machines comprise one or more information processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1202-1 in the processing platform 1200 comprises a processor 1210 coupled to a memory 1212.

The processor 1210 comprises a microprocessor, a CPU, a GPU, a TPU, a microcontroller, an ASIC, a FPGA or other type of processing circuitry, as well as portions or combinations of such circuitry elements.

The memory 1212 comprises random access memory (RAM), read-only memory (ROM) or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   obtaining, from multiple data sources, configuration information associated with at least one system;
   filtering out a subset of the configuration information based at least in part on at least one user request related to testing of at least a portion of the at least one system;
   determining at least a portion of the subset of the configuration information to be used in the testing of the at least a portion of the at least one system by processing the subset of the configuration information using one or more machine learning techniques; and
   performing one or more automated actions based at least in part on the determined at least a portion of the subset of the configuration information to be used in the testing;
   wherein the method is performed by at least one processing device comprising a processor coupled to a memory.

2. The computer-implemented method of claim 1, wherein performing one or more automated actions comprises automatically outputting, to at least one user associated with the at least one user request, using a machine learning-based chatbot, information identifying the determined at least a portion of the subset of the configuration information to be used in the testing.

3. The computer-implemented method of claim 1, wherein determining at least a portion of the subset of the configuration information comprises processing the subset of the configuration information using one or more unsupervised clustering models.

4. The computer-implemented method of claim 3, wherein processing the subset of the configuration information using one or more unsupervised clustering models comprises processing the subset of the configuration information using at least one bisecting K-Means algorithm.

5. The computer-implemented method of claim 3, wherein processing the subset of the configuration information using one or more unsupervised clustering models comprises clustering the subset of the configuration information into multiple groups based at least in part on one or more similarities across the subset of the configuration information.

6. The computer-implemented method of claim 5, wherein processing the subset of the configuration information using one or more unsupervised clustering models further comprises determining, for each of the multiple groups, a centroid as a representative configuration for a given group.

7. The computer-implemented method of claim 6, wherein processing the subset of the configuration information using one or more unsupervised clustering models further comprises determining, for at least a portion of the multiple groups, a number of items of the configuration information to be used in the testing by processing the at least a portion of the multiple groups using an elbow method.

8. The computer-implemented method of claim 1, wherein performing one or more automated actions comprises automatically initiating the testing of the at least one system using the determined at least a portion of the subset of the configuration information.

9. The computer-implemented method of claim 1, wherein performing one or more automated actions comprises automatically training at least a portion of the one or more machine learning techniques using feedback related to the determined at least a portion of the subset of the configuration information.

10. The computer-implemented method of claim 1, wherein filtering out the subset of configuration information comprises aggregating the subset of the configuration information into at least one fixed-size table.

11. The computer-implemented method of claim 1, wherein obtaining configuration information from multiple data sources comprises periodically searching at least a portion of the multiple data sources to identify one or more new configuration files.

12. The computer-implemented method of claim 11, wherein obtaining configuration information from multiple data sources comprises:
   comparing content of the one or more new configuration files to existing configuration information; and
   storing, in at least one database, each of the one or more new configuration files containing content not matching the existing configuration information.

13. The computer-implemented method of claim 1, wherein the obtained configuration information is in a plain text format, and wherein obtaining configuration information from multiple data sources comprises converting at least a portion of the configuration information in the plain text format to a JavaScript Object Notation (JSON) format.

14. The computer-implemented method of claim 1, wherein obtaining configuration information from multiple data sources comprises obtaining configuration information associated with the at least one system from one or more user-facing data sources and one or more internal system-related data sources.

15. A non-transitory processor-readable storage medium having stored therein program code of one or more software programs, wherein the program code when executed by at least one processing device causes the at least one processing device:
   to obtain, from multiple data sources, configuration information associated with at least one system;

to filter out a subset of the configuration information based at least in part on at least one user request related to testing of at least a portion of the at least one system;
to determine at least a portion of the subset of the configuration information to be used in the testing of the at least a portion of the at least one system by processing the subset of the configuration information using one or more machine learning techniques; and
to perform one or more automated actions based at least in part on the determined at least a portion of the subset of the configuration information to be used in the testing.

16. The non-transitory processor-readable storage medium of claim 15, wherein performing one or more automated actions comprises automatically outputting, to at least one user associated with the at least one user request, using a machine learning-based chatbot, information identifying the determined at least a portion of the subset of the configuration information to be used in the testing.

17. The non-transitory processor-readable storage medium of claim 15, wherein determining at least a portion of the subset of the configuration information comprises processing the subset of the configuration information using one or more unsupervised clustering models.

18. An apparatus comprising:
at least one processing device comprising a processor coupled to a memory;
the at least one processing device being configured:
to obtain, from multiple data sources, configuration information associated with at least one system;
to filter out a subset of the configuration information based at least in part on at least one user request related to testing of at least a portion of the at least one system;
to determine at least a portion of the subset of the configuration information to be used in the testing of the at least a portion of the at least one system by processing the subset of the configuration information using one or more machine learning techniques; and
to perform one or more automated actions based at least in part on the determined at least a portion of the subset of the configuration information to be used in the testing.

19. The apparatus of claim 18, wherein performing one or more automated actions comprises automatically outputting, to at least one user associated with the at least one user request, using a machine learning-based chatbot, information identifying the determined at least a portion of the subset of the configuration information to be used in the testing.

20. The apparatus of claim 18, wherein determining at least a portion of the subset of the configuration information comprises processing the subset of the configuration information using one or more unsupervised clustering models.

* * * * *